(12) United States Patent
Galehr (10) Patent No.: US 9,789,898 B2
(45) Date of Patent: Oct. 17, 2017

(54) ANGLE SUPERIMPOSITION APPARATUS FOR A VEHICLE STEERING DEVICE

(71) Applicant: THYSSENKRUPP PRESTA AG, Eschen (LI)

(72) Inventor: Robert Galehr, Mauren (LI)

(73) Assignee: THYSSENKRUPP PRESTA AG, Eschen (LI)

(*) Notice: Subject to any disclaimer, the term of this patent is extended or adjusted under 35 U.S.C. 154(b) by 97 days.

(21) Appl. No.: 14/759,064

(22) PCT Filed: Sep. 9, 2013

(86) PCT No.: PCT/EP2013/002694
§ 371 (c)(1),
(2) Date: Aug. 18, 2015

(87) PCT Pub. No.: WO2014/108144
PCT Pub. Date: Jul. 17, 2014

(65) Prior Publication Data
US 2016/0297469 A1      Oct. 13, 2016

(30) Foreign Application Priority Data
Jan. 9, 2013   (CH) ...................................... 0103/13

(51) Int. Cl.
*B62D 5/00*   (2006.01)
*F16H 1/30*   (2006.01)
(Continued)

(52) U.S. Cl.
CPC ............... *B62D 5/008* (2013.01); *B62D 3/04* (2013.01); *B62D 5/0454* (2013.01); *F16H 1/30* (2013.01)

(58) Field of Classification Search
CPC ......... B62D 5/008; B62D 3/04; B62D 5/0454
(Continued)

(56) References Cited

U.S. PATENT DOCUMENTS 7,306,535 B2 * 12/2007 Menjak .................. B62D 5/008
                                                      180/444
7,845,460 B2 * 12/2010 Waibel .................. B62D 5/008
                                                      180/444
(Continued)

FOREIGN PATENT DOCUMENTS

DE    102004031349    1/2006
EP        2216233    8/2010
FR        2429936    1/1980

OTHER PUBLICATIONS

PCT International Search Report mailed Jan. 20, 2014 for PCT International Application No. PCT/EP2013/002694, 5 pages.

*Primary Examiner* — Tony H. Winner
(74) *Attorney, Agent, or Firm* — RMCK Law Group, PLC (57) ABSTRACT

An angle superimposition apparatus for a vehicle steering device with a planetary gear. The apparatus includes—a first shaft and a second shaft, which are arranged in a longitudinal direction so as to be rotatable relative to one another about the common longitudinal axis thereof. —A carrier arrangement is fixedly arranged to the body shell, on which carrier arrangement the first shaft and the second shaft and a rotor shaft are at least partially mounted and positioned so as to be rotatable. —An auxiliary drive with a stator is arranged on the carrier arrangement and with a rotor shaft, having a rotor, mounted rotatably and arranged coaxially with respect to the longitudinal axis and one of the shafts. —A planetary gear having a worm, which is arranged as a sun wheel so as to be rotatable about an axis of rotation and is arranged on the rotor shaft.

19 Claims, 5 Drawing Sheets (51) Int. Cl.
  *B62D 3/04* (2006.01)
  *B62D 5/04* (2006.01)
(58) Field of Classification Search
  USPC .......................................................... 180/444
  See application file for complete search history.

(56) References Cited

U.S. PATENT DOCUMENTS 8,272,473 B2 * 9/2012 Hori ........................ B62D 5/008
  180/444
2010/0004823 A1 * 1/2010 Nakatsu ................. B62D 5/008
  701/41

* cited by examiner

ANGLE SUPERIMPOSITION APPARATUS FOR A VEHICLE STEERING DEVICE

CROSS-REFERENCE TO RELATED APPLICATIONS

This application is a 371 U.S. National Stage of International Application No. PCT/EP2013/002694, filed Sep. 9, 2013, which claims priority to Swiss Application No. CH00103/13 filed on Jan. 9, 2013. The disclosure of each of the above applications is incorporated herein by reference in their entirety.

FIELD

The disclosure relates to an angle superposition device for a vehicle steering apparatus.

BACKGROUND

The disclosure relates in particular to an angle superposition device with servo drive for a steering system for non-trackbound motor vehicles which superposes the rotational speeds of the servo drive and the control actions input by the driver at the steering wheel and transmits and converts these into the steering movement of the wheels. The expressions "rotational angle superposition device", "steering angle superposition device" or "rotational speed superposition device" are used synonymously for the expression "angle superposition device".

A range of such systems are known in the prior art, wherein the rotational speed superposition gearing of the angle superposition device is realized by way of a planetary gear set, or else additionally has a worm gear mechanism.

DE19823721A1 proposes an angle superposition device of said type. In this case, by way of a steering wheel, a housing is driven in which toothings of an internal gear of two planetary gear sets are situated. An electric motor arranged in the housing drives the sun gear of the first planetary gear set. The planet carrier of the first planetary gear set drives the sun gear of the second planetary gear set. The planets of the second planetary gear set are supported on the internal gear of the housing, and the planet carrier is connected to the output shaft. In the embodiment shown, the drive of the sun gear of the first planetary gear set is realized directly by way of the rotor of the electric motor. Through corresponding control of the electric motor, the desired rotational speed superpositions can be realized. Said solution which is presented in the prior art however has some significant disadvantages. Such gearings are composed of a multiplicity of components. Two internal gear rings or planetary gear sets are required. The production of the individual parts is highly complex and expensive. The multiplicity of points of meshing engagement leads to very high accuracy requirements in order to avoid play. Furthermore, the entire device, including motor housing, must be jointly rotated by the driver during steering actions. A further disadvantage furthermore consists in the cumbersome coupling-in of the electrical energy for the electric motor.

In further prior art, DE19852447A1, a solution for rotational speed superposition is proposed in which an electric motor is coupled by way of a worm drive to the superposition gearing, which is in the form of a planetary gear set. In this case, the gearing unit is arranged fixedly with respect to a body. However, this solution is also associated with a series of disadvantages. The coupling-in by way of a worm gearing leads to very low levels of efficiency of the rotational speed transmission. Furthermore, the arrangement requires a considerable amount of installation space, with little flexibility owing to the geometrically defined positions of the components with respect to one another. In this case, too, the production of the individual parts is complex and expensive and the demands with regard to production tolerances is correspondingly high.

SUMMARY

It is the object of the present disclosure to eliminate the disadvantages of the prior art and, at the same time, provide a compact assembly which permits rotational speed superposition with a small number of components, which can be produced in as simple a manner as possible. Furthermore, the connection of the energy supply of the servo drive, and to sensors that are used if necessary, should be simplified.

The object is achieved according to the disclosure by way of the angle superposition device corresponding to claim 1. Dependent claims 2 to 17 concern preferred embodiments of the angle superposition device.

Here, an angle superposition device for a vehicle steering apparatus having a planetary gear set is proposed, which angle superposition device comprises:
- a first shaft and a second shaft, which are arranged in a longitudinal direction so as to be rotatable relative to one another about their common longitudinal axis,
- a carrier arrangement which is arranged fixedly with respect to a body and on which the first shaft and the second shaft and a rotor shaft are at least partially mounted and rotatably positioned,
- a servo drive with a stator arranged on the carrier arrangement and with a rotatably mounted rotor shaft arranged coaxially with respect to the longitudinal axis and one of the shafts, which rotor shaft has a rotor,
- a planetary gear set with a worm which is arranged, so as to be rotatable about an axis of rotation, as a sun gear and which is arranged on the rotor shaft and which meshes with the toothing of at least two planet gears, which are each arranged with a planet gear axis on a planet carrier, wherein the planet gears in turn mesh with the internal toothing of an internal gear,
- wherein the planet carrier is connected rotationally conjointly to the second shaft and the internal gear is connected rotationally conjointly to the first shaft,
- and wherein the servo drive superposes a rotational movement transmitted between the first shaft and the second shaft.

In this case, the worm is advantageously arranged such that the axis of rotation thereof coincides with the longitudinal axis. The toothing of the worm is of at least single-flight configuration. In this case, the toothing is preferably configured with fewer than four flights. The worm is particularly preferably formed with a single-flight toothing.

To suitably ensure the meshing of the planet gears with the worm and with the internal toothing of the internal gear, it is preferable for at least one of the planet gear axes to be arranged such that they do not intersect the longitudinal axis and are oriented non-parallel to one another. It should preferably be provided that all of the planet gear axes do not intersect the longitudinal axis and are oriented non-parallel to one another.

It is advantageously the case that all of the planet gear axes are arranged such that, in pairs in each case, they do not intersect and, in pairs in each case, they are arranged non-parallel to one another. It is also possible that only two planet gear axes do not intersect and are non-parallel, whereas the other planet gear axes may optionally intersect and be parallel.

It is advantageously the case that the angles, as viewed from a projection plane, between one or more of the planet gear axes and the longitudinal axis lie in the range between 5° inclusive to 65° inclusive, more preferably in the range from 25° inclusive to 65° inclusive. Ranges from 40° to 50° are particularly preferable. The smallest spacing between the planet gear axes and the longitudinal axis advantageously lies in a range from one third of the planet gear diameter up to and including the sum of one full planet gear diameter and the full sun gear diameter. Spacings in the range between the sum of one third of the planet gear diameter and one third of the sun gear diameter to the sum of two thirds of the planet gear diameter and two thirds of the sun gear diameter are preferable.

The first shaft and the second shaft may be interchanged in terms of their function. Consequently, the first shaft may be the input shaft and the second shaft may be the output shaft, or the first shaft may be the output shaft and the second shaft may be the input shaft.

In the event of faults or special vehicle situations—for example an electrical failure, control failure or when the ignition is switched off, etc., there should be a direct mechanical coupling between the input and output shafts, such that the driver is provided with full control of the steering system. In the case of the present angle superposition device according to the disclosure, this is inherently already ensured, because owing to the connection of a worm, as sun gear, of the planetary gear set, a self-locking effect arises when the drive of the angle superposition device is not activated. In an advantageous refinement, it is also possible for a safety clutch or a switch to additionally be integrated into the angle superposition device, which safety clutch or switch forcibly realizes a direct mechanical coupling between input shaft and output shaft in the event of a fault or in special vehicle situations—for example electrical failure, control failure or when the ignition is switched off etc.—such that the driver is provided with full control of the steering system. The coupling may for example be realized in a very simple manner by virtue of the rotor of the servo drive being blocked in relation to the stator or the housing of the device. In this way, increased safety can additionally be ensured. It is correspondingly conceivably possible for a direct mechanical coupling between the planet carrier and the sun gear or a direct mechanical coupling between the planet carrier and internal gear or a direct mechanical coupling between the internal gear and sun gear to be provided as a redundant safety clutch. In this case, known friction clutches and/or positively engaging clutches may be used.

BRIEF DESCRIPTION OF THE FIGURES

The disclosure will now be described schematically and by way of example on the basis of figures, in which.

DETAILED DESCRIPTION

Figure 1:
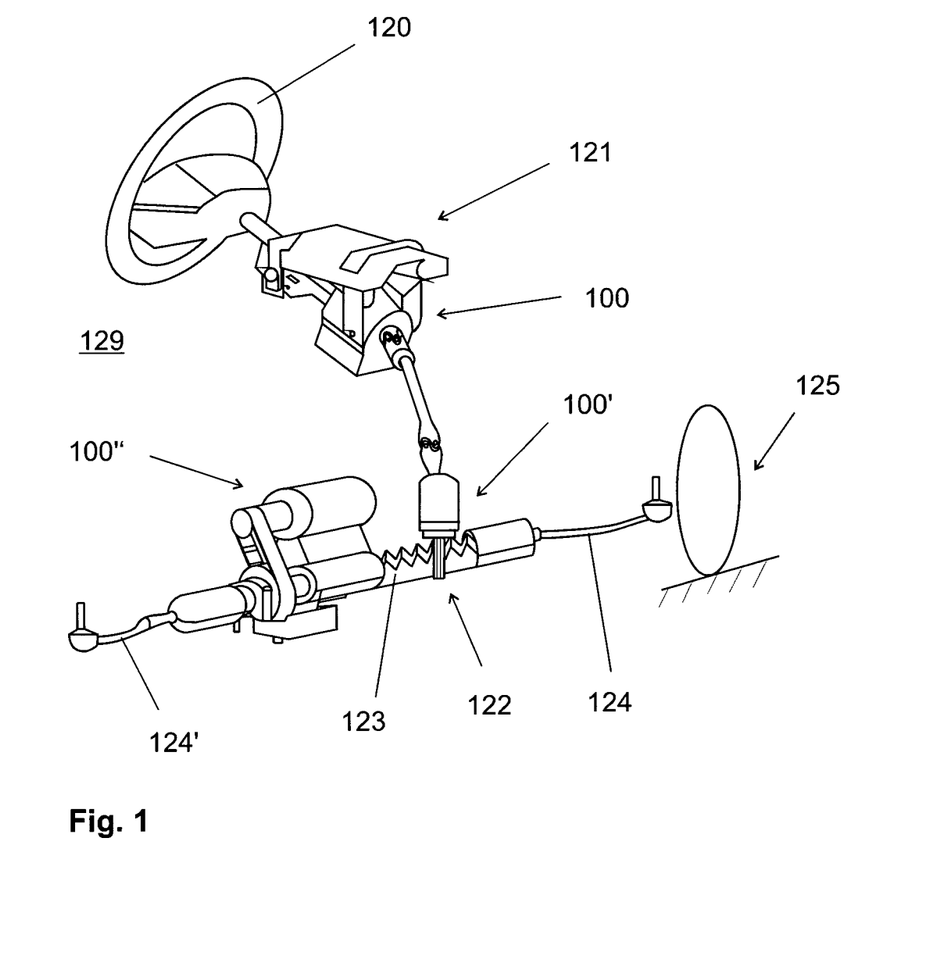
FIG. 1 is a three-dimensional illustration of a vehicle steering apparatus with servo assistance and an angle superposition device.

The schematic construction of a steering apparatus 129 shown in FIG. 1 as a steering apparatus 129 with electric servo assistance corresponds substantially to the prior art. Said steering apparatus is composed inter alia of a steering wheel 120, a steering column 121, the steering gear 122 and the two track rods 124, 124', which on both sides are connected to in each case one wheel 125 for the purpose of pivoting said wheels. The track rods 124, 124' are driven by the toothed rack 123. Rotational speed superposition is realized by way of the angle superposition device 100, 100' according to the disclosure. In this case, the angle superposition device 100', which as already stated may also be referred to as a rotational speed superposition device, may also be directly integrated into the steering gear 122. In the example, the steering apparatus comprises a servo assistance means with servo drive 100" for forming an electrically assisted steering aid. The servo assistance means for coupling in a servo steering force may be arranged in the region of the steering gear, as shown in the example, or of the steering column, separately or else in combination with the angle superposition device 100, 100'.

Figure 2:
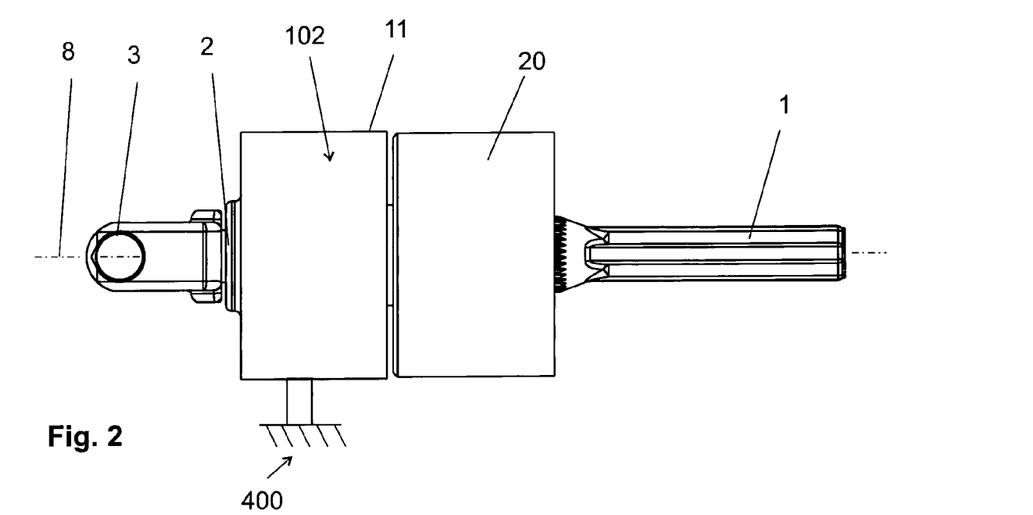
FIG. 2 shows a side view of an angle superposition device.
Figure 3:
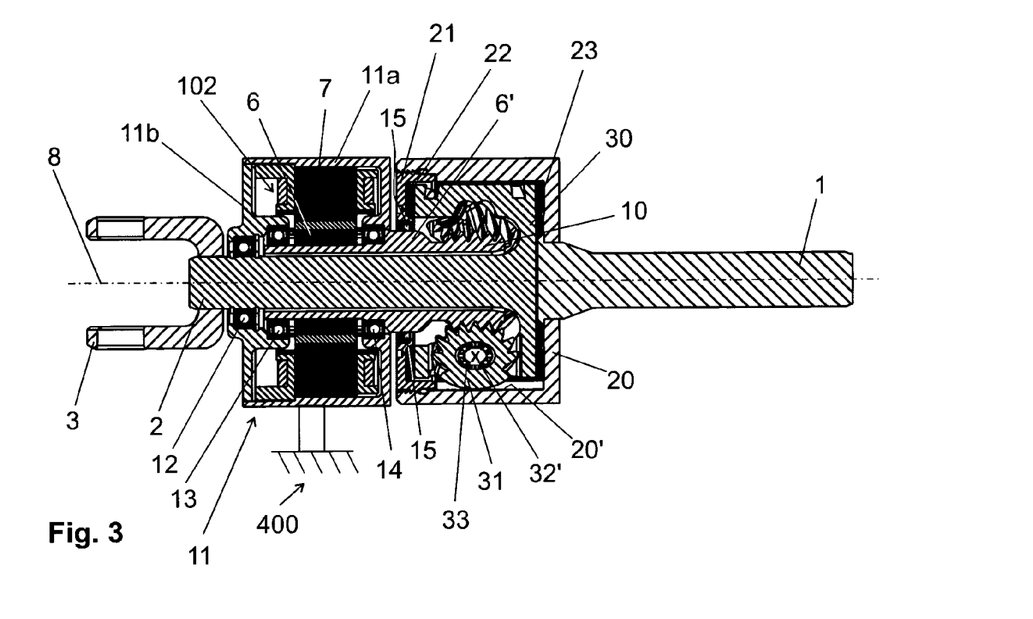
FIG. 3 shows a longitudinal section through the angle superposition device according to the disclosure.

In the preferred embodiment, the angle superposition device is situated between the steering wheel 120 and the steering gear 122, for example relatively close to the steering wheel 120 at the location denoted by 100. FIGS. 2 and 3 show this embodiment of the angle superposition device 100 in more detail.

In a further embodiment, the angle superposition device is arranged between the steering gear 122 and track rods 124 or in the steering gear. The angle superposition device then comprises a conversion gearing for converting the rotational movement into a translational movement, said conversion gearing being for example a ball-screw drive or a ball-screw nut.

In all embodiments, in the normal situation, the driver demand is input as a signal into a control unit by way of a sensor arrangement (not shown here) by means of the steering wheel 120. From said signal, possibly with the aid of a sensor signal from the servo drive of the steering system (signal line not illustrated here) and/or from the angle superposition device and further signals which describe the state of the vehicle, the control unit determines the corresponding control voltage for the electric motor and outputs it to the electric motor, to the angle superposition device 100 or 100' and/or to the servo drive 100" for the electrically assisted steering aid.

The disclosure relates to an angle superposition device 100, 100' in the arrangement in a steering system 129 for a motor vehicle. The angle superposition device according to the disclosure may in this case be used in a steering system with or without servo assistance. In addition to the use of an angle superposition device according to the disclosure, it is also possible for a servo assistance means, which may be provided, of the steering system to be realized by hydraulic, pneumatic or electric means, for example also in accordance with the drive concept according to the present disclosure.

The vehicle steering apparatus according to the disclosure, corresponding to the exemplary embodiments, comprises an angle superposition device 100, 100' with a preferably electric drive 102, which is connected by way of a planetary gear set 10, 11, 20, 31 with a second shaft, for example the output shaft 2 with the longitudinal axis 8, to a steering gear 122.

Said drive apparatus with the planetary gear set may be used advantageously both for an electrically assisted steering aid and for an angle superposition device. The arrangement is particularly suitable as an angle superposition device.

The details of the disclosure will now be discussed in further detail on the basis of FIGS. 2 to 11 with reference to various exemplary embodiments.

The angle superposition device 100 for a vehicle steering apparatus having a planetary gear set comprises:
  a first shaft and a second shaft, which are arranged in a longitudinal direction so as to be rotatable relative to one another about their common longitudinal axis 8,
  a carrier arrangement 11, 11a, 11b which is arranged fixedly with respect to a body and on which the first shaft and the second shaft and a rotor shaft 6' are at least partially mounted and rotatably positioned,
  a servo drive 6, 7 with a stator 7 arranged on the carrier arrangement 11, 11a, 11b and with a rotatably mounted rotor shaft 6' arranged coaxially with respect to the longitudinal axis 8 and one of the shafts, which rotor shaft has a rotor 6,
  a planetary gear set with a worm 10 which is arranged, so as to be rotatable about an axis of rotation, as a sun gear and which is arranged on the rotor shaft 6' and which meshes with the toothing of at least two planet gears 31, which are each arranged with a planet gear axis 32' on a planet carrier 30, wherein the planet gears 31 in turn mesh with the internal toothing 20' of an internal gear 20,
  wherein the planet carrier 30 is connected rotationally conjointly to the second shaft and the internal gear 20 is connected rotationally conjointly to the first shaft,
  and wherein the servo drive 6, 7 superposes a rotational movement transmitted between the first shaft and the second shaft.

The carrier arrangement 11 preferably comprises an electric drive 102 as servo drive, and is arranged fixedly with respect to the body on the chassis 400, as is schematically illustrated in FIGS. 2 and 3. The stator 7 is fixedly installed in said carrier arrangement 11 and thus does not conjointly rotate. The carrier arrangement 11 is for example surrounded by a housing which is composed of a first housing part 11a and a second housing part in the form of a cover 11b. The internal gear 20 is connected rotationally conjointly to the first shaft and is for example rotatably mounted so as to be positioned directly adjacent to the drive. The second shaft is for example led through the carrier arrangement 11 with the drive 102 and is then available there for example as an output shaft 2, which can be connected to a joint 3 which transmits the rotational movement onward to the steering gear. In this case, the first shaft is the input shaft, which is connected to the steering wheel 120.

Figures 6, 7, 8, 9:
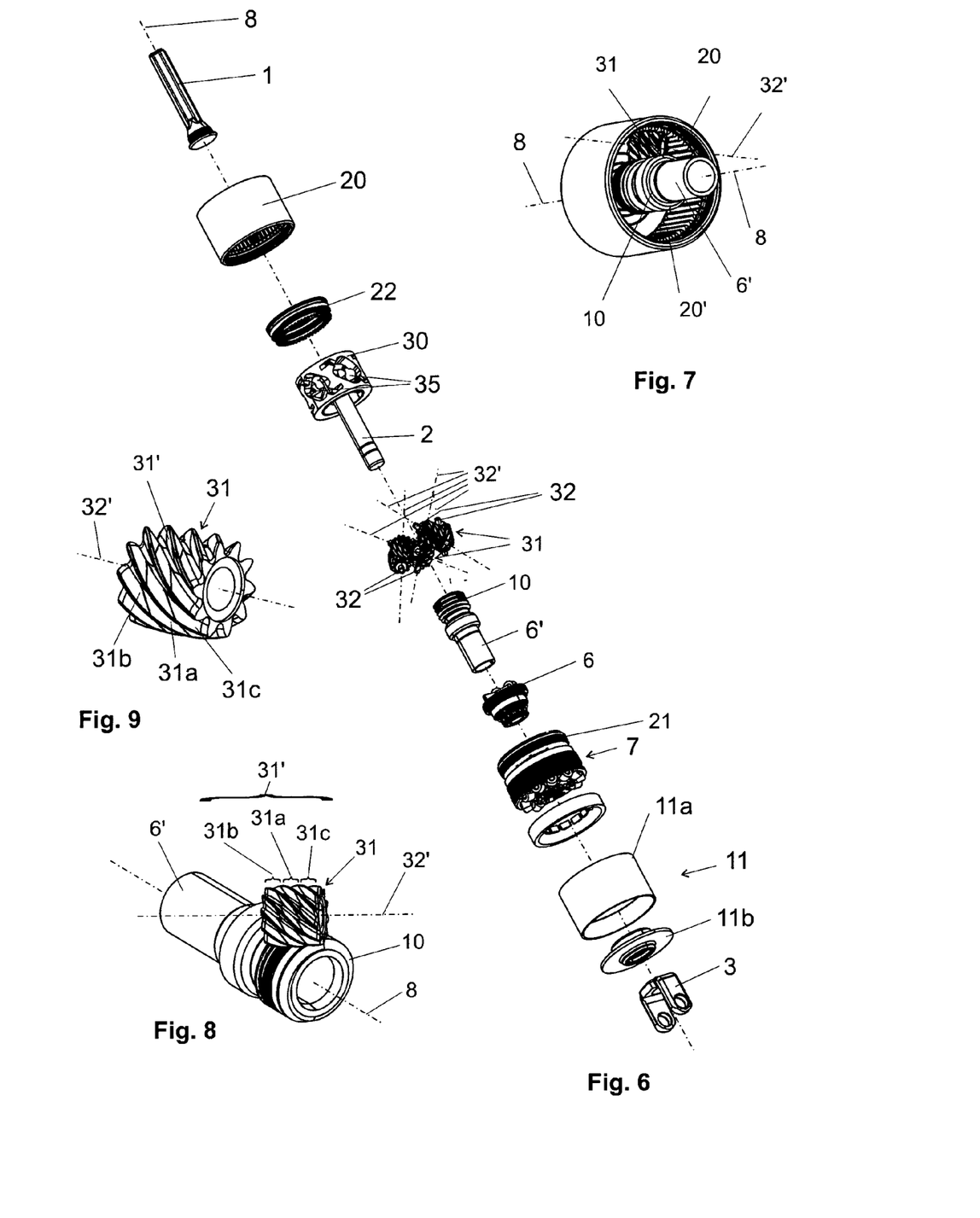
FIG. 6 is a three-dimensional exploded illustration of an angle superposition device corresponding to the preceding FIGS. 3 to 5.
FIG. 7 is a three-dimensional illustration of the rotor shaft with the sun gear in the form of a worm, which meshes for example with a planet gear, wherein the planet gear meshes with the internal toothing of the internal gear.
FIG. 8 is a three-dimensional illustration, for example, of a single planet gear meshing with the worm of the sun gear, and having different regions of the toothing of the planet gear.
FIG. 9 is a three-dimensional illustration of a planet gear with the toothing thereof and with different regions of the toothing.

As shown in FIGS. 2, 3 and 6, the axis of rotation of the worm 10 coincides with the longitudinal axis 8. They thus have a common longitudinal axis 8.

The planet gears 31 are arranged around the longitudinal axes 8 such that at least one of the planet gear axes 32' and the longitudinal axis 8 do not intersect and are oriented non-parallel to one another, as illustrated in FIGS. 3 to 8 and FIGS. 10 and 11. By contrast, the planet gears 31 are advantageously arranged such that all of the planet gear axes 32' and the longitudinal axis 8 do not intersect and are oriented non-parallel to one another.

The planet gears 31 may also be arranged such that all of the planet gear axes 32', in pairs in each case, do not intersect and, in pairs in each case, are oriented non-parallel to one another.

A further preferred embodiment of an angle superposition device according to the disclosure is designed such that:
  the stator 7, with the rotor 6 which is arranged coaxially with respect to the second shaft and which has the rotor shaft 6', is rotatably mounted by means of a bearing arrangement 13, 14, and is provided with a bearing arrangement 12 for the rotatable positioning of the second shaft relative to the carrier arrangement 11, 11a, 11b,
  wherein the worm 10 is in the form of a toothing on an end region of the rotor shaft 6' in the direction of the first shaft,
  wherein the planet carrier 30 is connected at the end side in the direction of the first shaft to the second shaft, wherein said planet carrier is of bell-shaped form and surrounds the worm 10 on the rotor shaft 6' at the end side, wherein the planet carrier 30 has recesses 35 for receiving a rotatably mounted planet gear 31 with the planet gear axis 32' within in each case one of the recesses, wherein at least two planet gears 31 are provided,
  wherein the internal gear 20 has with an internal toothing 20' and is connected rotationally conjointly to the first shaft and coaxially surrounds the bell-shaped planet carrier 30, in such a way that the planet gears 31 are positioned between the worm 10 and the internal gear 20 and, by way of the toothings 31', mesh with the worm 10 and the internal toothing 20' of the internal gear 20, whereby a gearing arrangement is formed,
  wherein a bearing arrangement 22, 23 is provided for the axial mounting of the internal gear 20 relative to the planet carrier 30, wherein in each case one axial bearing 22, 23 is arranged at the end side on both sides of the planet carrier 30, between the planet carrier 30 and lateral flanks of the internal gear 20, said axial bearings being spaced apart from one another in the axial direction with respect to the longitudinal axis 8.

Furthermore, to form the respective planet gear axis 32', a planet gear spindle bolt 32 may be provided which projects out on both sides of the planet gear 31. Said planet gear spindle bolt is arranged on both sides in in each case one depression 36 of the planet carrier 30, said depressions being provided laterally on one of the recesses 35 of the planet gear carrier 30, as is illustrated for example in FIGS. 3 to 5 and FIGS. 10 and 11.

Figure 4:
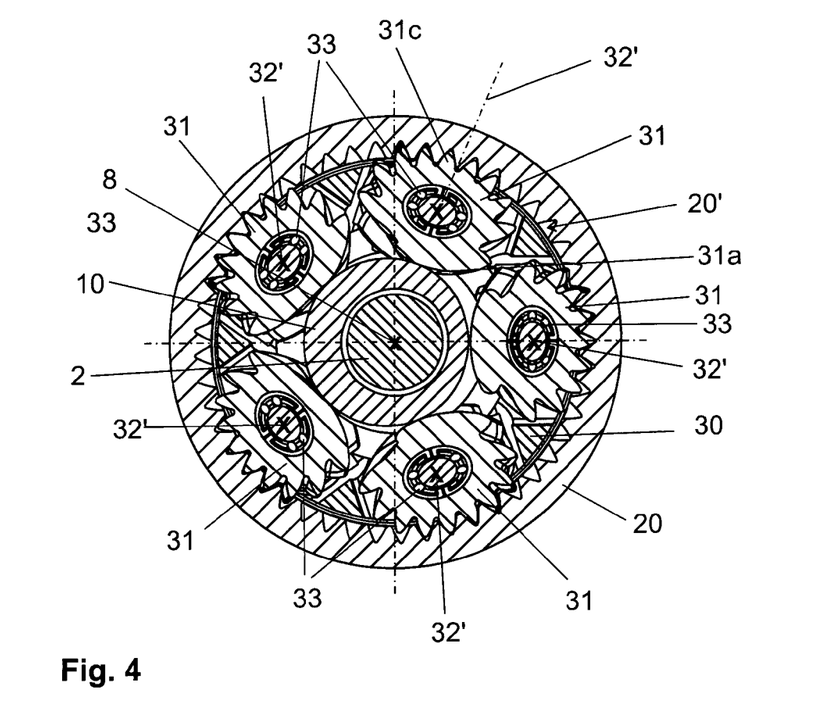
FIG. 4 shows a cross section through the angle superposition device in the region of the sun gear, which is in the form of a worm, with the planet gears and the internal gear according to the disclosure.

To realize smooth running of the planet gears 31 with low wear, the planet gear 31 is mounted rotatably with respect to its associated planet gear spindle bolt 32 by way of a planet gear bearing arrangement 33, 33'. For example, a first planet gear bearing arrangement 33 may be arranged between the planet gear spindle bolt 32 and the planet gear 31 as a radial bearing arrangement, as shown in FIGS. 3 to 5.

Figure 5:
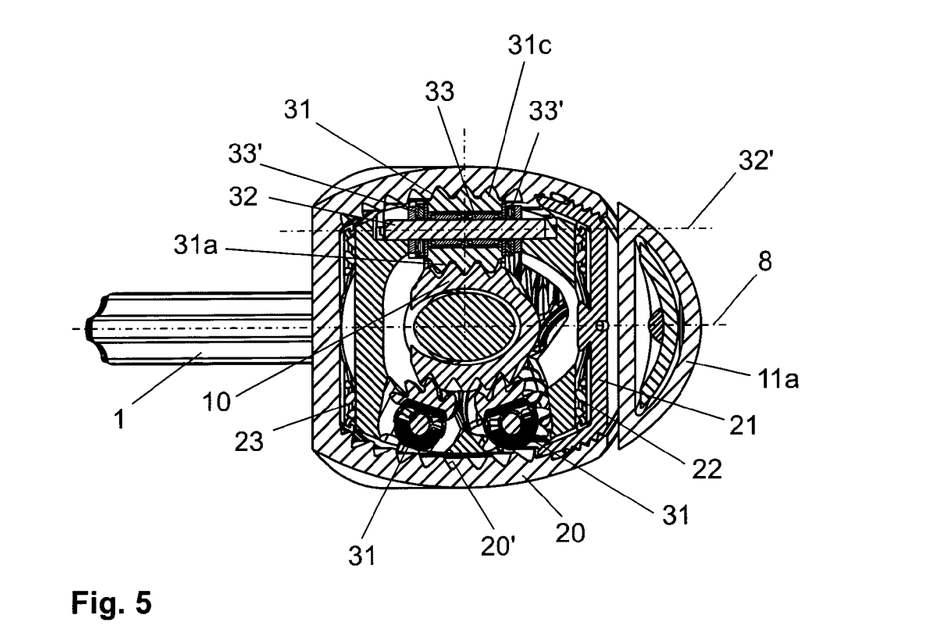
FIG. 5 is a further sectional illustration of the angle superposition device, with the section plane running through the axis of one of the planet gears.
Figure 10:
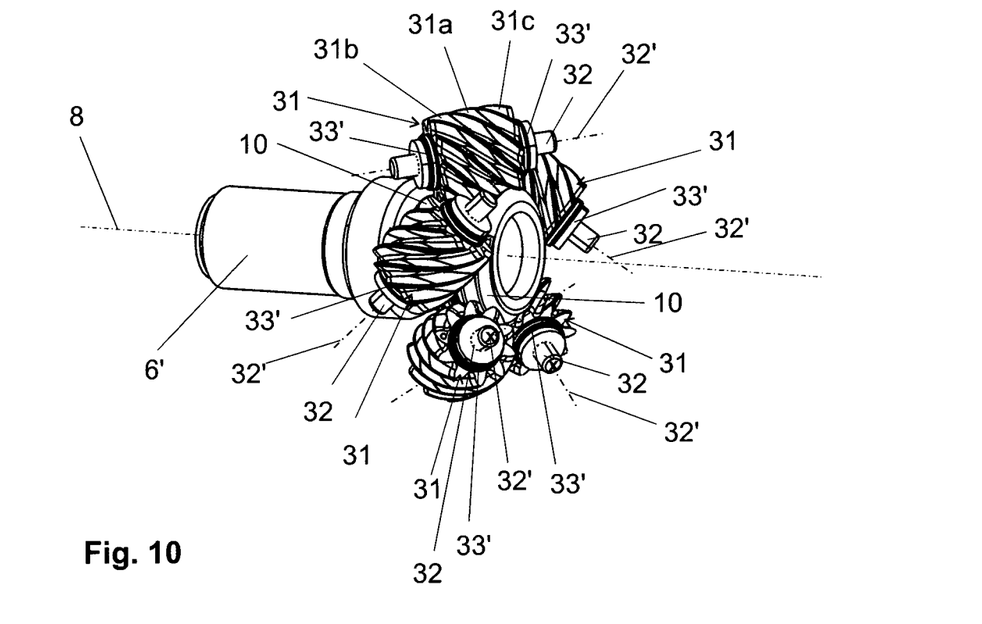
FIG. 10 is a further three-dimensional illustration of the rotor shaft with the sun gear in the form of a worm, meshing for example with five planet gears.
Figure 11:
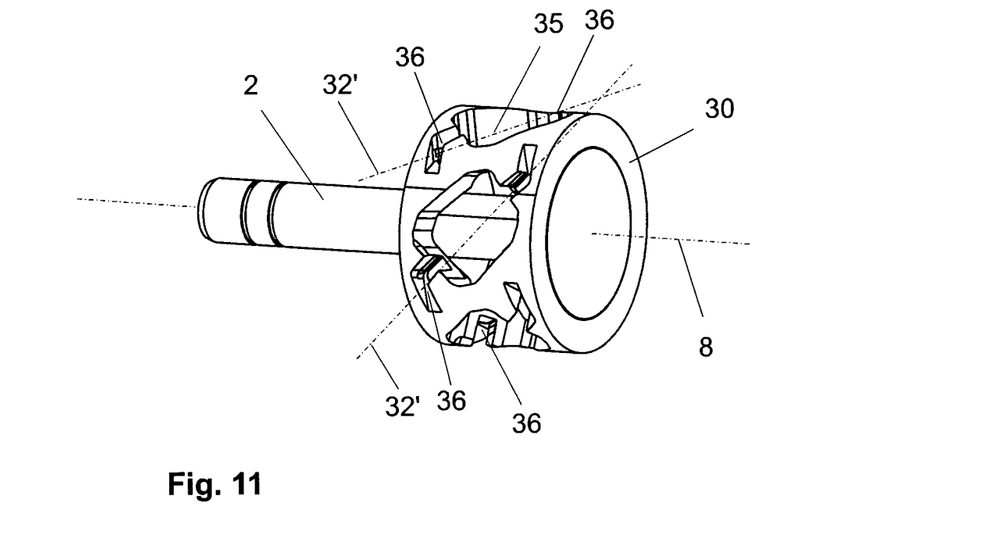
FIG. 11 is a three-dimensional illustration of the planet carrier with recesses for the mounting of planet gears.

As shown in FIGS. 5 and 10, it is additionally advantageously possible for a further planet gear bearing arrangement 33' to be arranged on the end side and for an axial bearing arrangement 33' to be arranged on both sides of the planet gear 31, in order to also reduce the friction between the planet gear 31 and the planet carrier 30 in an axial direction.

It is advantageous if the planet carrier 30 accommodates at least three rotatably mounted planet gears 31, which are arranged in in each case one recess 35.

Furthermore, it is advantageous if the toothing on the rotor shaft 6' is in the form of a worm 10 of at least single-flight configuration but preferably at most five-flight configuration, or better still at most three-flight configuration. The single-flight configuration of the worm 10 is particularly preferred.

Particularly good running characteristics of the planetary gear set can be realized by virtue of the planet gear toothing 31' on the planet gears 31 being of helical form, as can be seen from FIGS. 3 and 7 to 10. In this way, the meshing of the planet gear toothing 31' with the internal gear internal toothing 20' and the worm 10 can be well coordinated. Furthermore, said meshing can be optimized by way of additional special shaping of the planet gear toothing 31', such as for example a slight twisting of the rows of teeth on the planet gear 31. It is also additionally possible for the internal gear internal toothing 20' to be correspondingly optimized by adaptation and equipped with a special toothing, such as for example a toothing of helical or some other form. Here, it has been found that, by means of the special form of the toothing 31' of the planet gears, in particular with the toothing regions 31a, 31b, 31c, a straight internal gear internal toothing 20' extending in the direction of the longitudinal axis 8 can be particularly suitable. In this way, the toothings of the planetary gear set with the worm 10, the internal gear 20 and the planet gears 31 can be optimized and thus low running noises can be attained even in the case of high transmission ratios and with high efficiency.

A further improvement is made possible if the toothing 31' on the planet gears 31 is formed so as to be optimized for the regions of meshing engagement with the worm 10 and with the toothing 20' of the internal gear 20. This may advantageously be realized by virtue of the toothing 31' on the planet gears 31 being divided, in the longitudinal direction, into different toothing regions, preferably into three toothing regions 31a, 31b, 31c, wherein the middle toothing region 31a is optimized for meshing engagement with the worm 10 and the two outer toothing regions 31b, 31c are optimized for meshing engagement with the toothing 20' of the internal gear 20, as is schematically illustrated in FIGS. 7 to 9.

The gearwheels 10, 20, 31 concerned may be manufactured from plastic, whereby even the special shaping can be produced economically. This is particularly suitable in particular for the planet gears 31.

A particularly suitable and preferred exemplary embodiment corresponds to the schematic illustration of FIGS. 2 to 11.

In this case, the angle superposition device comprises:
an input shaft 1 and an output shaft 2, which are arranged in a longitudinal direction so as to be rotatable relative to one another about their common longitudinal axis 8,
a carrier arrangement 11, 11a, 11b which is arranged fixedly with respect to a body and which has a servo drive 6, 7 with a stator 7 arranged on the carrier arrangement 11, 11a, 11b and with a rotor 6 which is arranged coaxially with respect to the output shaft 2 and which has the rotor shaft 6', which is rotatably mounted by way of a bearing arrangement 13, 14 and by way of a bearing arrangement 12 of the output shaft for rotatable positioning relative to the carrier arrangement 11, 11a, 11b,
a toothing of one end region of the rotor shaft 6', in the direction of the input shaft 1, wherein said toothing is in the form of a worm 10,
a planet carrier 30 which is connected at the end side, in the direction of the input shaft 1, to the output shaft 2, wherein said planet carrier is of bell-shaped form and surrounds the worm 10 on the rotor shaft 6' at the end side, wherein the planet carrier 30 has recesses 35 for receiving a rotatably mounted planet gear 31 with the planet gear axis 32' within in each case one of the recesses, wherein at least two planet gears 31 are provided,
an internal gear 20 with an internal toothing 20' which is connected rotationally conjointly to the input shaft 1 and coaxially surrounds the bell-shaped planet carrier 30, in such a way that the planet gears 31 are positioned between the worm 10 and the internal gear 20 and, by way of their toothings, mesh with the worm 10 and with the internal toothing 20' of the internal gear 20, whereby a gearing arrangement is formed,
a bearing arrangement 22, 23 for the axial mounting of the internal gear 20 relative to the planet carrier 30, wherein in each case one axial bearing 22, 23 is arranged at the end side on both sides of the planet carrier 30, between the planet carrier 30 and lateral flanks of the internal gear 20, said axial bearings being spaced apart from one another in the axial direction with respect to the longitudinal axis 8,
wherein additionally, provision may be made of an internal gear bearing arrangement arranged on the rotor shaft 6 in the region between the rotor 6 and the worm 10 for the radial mounting of the internal gear 20 with the input shaft.

Alternatively to the internal gear bearing arrangement, and preferably, a seal 15 may be provided for sealing off the planetary gear set. This variant is preferred as overdeterminacy of the gearing arrangement is prevented by way of the radially floating bearing arrangement. As a seal 15, a shaft sealing ring may be provided.

Here, it may be advantageous if, on the end side of the internal gear 20, the latter is equipped with an annular internal gear cover 21 which supports the internal gear 20 the seal 15.

The functions of the first shaft and of the second shaft may be interchanged. The first shaft may be the input shaft 1 and the second shaft may be the output shaft 2, which is preferable.

The first shaft may however also be the output shaft 2, wherein then, the second shaft is the input shaft 1.

The invention claimed is:

1. An angle superposition device for a vehicle steering apparatus, the angle superposition device comprising:
   a first shaft that rotates about a first axis;
   a second shaft that rotates about a second axis, the first and second axes defining a common longitudinal axis;
   a servo drive collectively comprising a rotor and a stator, the rotor having a rotor shaft that is configured for rotation about the longitudinal axis;
   a carrier arrangement that at least partially supports the first shaft, the second shaft and the rotor shaft;
   a planetary gear set having:
      a planet carrier;
      an internal gear; and
      at least two planet gears arranged for rotation on the planet carrier and meshed for rotation to the internal gear and a worm gear, wherein one of the planet carrier and internal gear is rotatably coupled to the first shaft and the other of the planet carrier and internal gear is rotatably coupled to the second shaft; and
   wherein the servo drive superimposes a rotational movement transmitted between the first and second shafts.

2. The angle superposition device of claim 1 wherein the worm gear is defined on the rotor shaft, the worm gear rotating about the longitudinal axis.

3. The angle superposition device of claim 2 wherein one of the at least two planet gears rotates about a planet gear axis, the planet gear axis being non-parallel and non-intersecting relative to the longitudinal axis.

4. The angle superposition device of claim 2 wherein the at least two planet gears includes a plurality of planet gears, the planet gears rotate about axes that are non-parallel relative to and do not intersect the longitudinal axis.

5. The angle superposition device of claim 4 wherein each planet gear axis of a respective planet gear is non-intersecting and non-parallel relative to a remainder of the planet gear axes.

6. The angle superposition device of claim 1, further comprising a bearing arrangement that is rotatably supported between the second shaft and the carrier arrangement, the bearing arrangement axially mounting the internal gear relative to the planet carrier and comprising first and second bearings arranged on opposite sides of the planet carrier.

7. The angle superposition device of claim 6 wherein the worm is in a form of a worm toothing on an end region of the rotor shaft in a direction of the first shaft, wherein the planet carrier is of bell-shaped form and surrounds the worm on the rotor shaft, the planet carrier having recesses for receiving the at least two planet gears.

8. The angle superposition device of claim 7 wherein the internal gear has an internal toothing and is connected rotationally to the first shaft, the internal gear surrounding the planet carrier in such a way that the at least two planet gears are positioned between the worm and the internal gear, and by way of the toothings, mesh with the worm and the internal toothing of the internal gear whereby a gearing arrangement is formed.

9. The angle superposition device of claim 8 wherein each planet gear rotates about a spindle bolt that projects out opposite sides of a respective planet gear, the spindle bolt arranged in a corresponding depression of the planet carrier.

10. The angle superposition device of claim 9 wherein each planet gear has a planet gear bearing arrangement with respect to its associated spindle bolt.

11. The angle superposition device of claim 10 wherein the planet gear bearing arrangement comprises a radial planet gear bearing arrangement between the spindle bolt and the planet gear.

12. The angle superposition device of claim 10 wherein the planet gear bearing arrangement comprises an axial bearing arrangement on opposite sides of the planet gear.

13. The angle superposition device of claim 6 wherein the planet carrier accommodates the at least two planet gears which are arranged in a respective recess defined in the planet carrier.

14. The angle superposition device of claim 6 wherein a toothing on each planet gear of the at least two planet gears is divided in a longitudinal direction into has three distinct toothing regions.

15. The angle superposition device of claim 6 wherein a toothing of the at least two planet gears is of helical form.

16. The angle superposition device of claim 15 wherein the toothing on the at least two planet gears is formed so as to be optimized for regions of meshing engagement with the worm and with the toothing of the internal gear.

17. The angle superposition device of claim 14 wherein the three distinct toothing regions comprises a middle toothing region optimized for meshing engagement with the worm and two outer toothing regions optimized for meshing engagement with a toothing of the internal gear.

18. The angle superposition device of claim 6 wherein the first shaft is an input shaft and the second shaft is an output shaft.

19. The angle superposition device of claim 6 wherein the first shaft is the output shaft and the second shaft is the input shaft.

* * * * *